United States Patent [19]

Woollam et al.

[11] 3,849,875

[45] Nov. 26, 1974

[54] HALL EFFECT MAGNETOMETER

[75] Inventors: John A. Woollam, Oberlin, Ohio; Harry A. Beale, Riverdale; Ian L. Spain, Edgewater, both of Md.

[73] Assignee: The United States of America as represented by the Administrator of the National Aeronautics and Space Administration, Washington, D.C.

[22] Filed: Jan. 30, 1973

[21] Appl. No.: 327,969

Related U.S. Application Data

[62] Division of Ser. No. 254,173, May 17, 1972.

[52] U.S. Cl. .................. 29/592, 29/571, 307/309, 317/235 H, 330/6
[51] Int. Cl. ........................................... G01r 33/06
[58] Field of Search ........ 324/45; 29/592, 593, 584, 29/571, 574; 317/235 R, 235 G, 235 H, 235 B; 307/309; 330/6, 30 D; 329/200

[56] References Cited
UNITED STATES PATENTS

| | | | |
|---|---|---|---|
| 2,707,769 | 5/1955 | Sharper | 324/45 |
| 2,877,394 | 3/1959 | Kuhrt | 324/45 X |
| 2,969,584 | 1/1961 | Bobb | 29/593 |
| 3,348,987 | 10/1967 | Stark et al. | 29/592 |
| 3,714,523 | 1/1973 | Bate | 324/45 X |
| 3,714,559 | 1/1973 | Bate | 324/45 X |

Primary Examiner—C. W. Lanham
Assistant Examiner—Joseph A. Walkowski
Attorney, Agent, or Firm—N. T. Musial; J. A. Macklin; J. R. Manning

[57] ABSTRACT

A magnetometer utilizing a single crystal of $Bi_2Se_3$ having a rhombohedral crystal structure is described along with a method for making such a device. The $Bi_2Se_3$ has a positive or negative Hall coefficient and a carrier concentration of about $10^{18}$ to $10^{20}$ per cubic centimeter.

3 Claims, No Drawings

HALL EFFECT MAGNETOMETER

This is a division, of application Ser. No. 254,173 filed May 17, 1972.

ORIGIN OF THE INVENTION

The invention described herein was made by an employee of the United States Government and by non-governmental inventors and may be made or used by or for the Government of the United States of America for governmental purposes without the payment of any royalties thereon or therefor.

BACKGROUND OF THE INVENTION

The invention relates to an apparatus for measuring magnetic fields and is directed more particularly to a Hall effect magnetometer.

As technology advances, magnets of increasing field strength and superconducting solenoids are being developed and improved. With these increasingly higher strength magnetic fields and the operation of magnets at temperatures down to 1°K the difficulty of obtaining accurate and convenient measurements of field strength likewise increases. The nuclear magnetic resonance method of measuring magnetic field strength is quite accurate but high magnetic field homogeneity is needed. Furthermore, difficulties are involved in making a nuclear resonance measurement at the same time as performing other measurements.

Magnetometers of the copper magnetoresistor type have an approximately linear output for field variation occurring at high field strengths. However, the calibration of such devices is very temperature sensitive and at low field strength their output is quadratically dependent on magnetic field strength.

Magnetometers have been built and studied utilizing the Hall effect. The Hall effect occurs when a body of material is placed in a magnetic field and a current is directed through a body in a direction generally perpendicular to the magnetic field, the effect being a voltage difference which is produced between two points on the body, the two points lying on an imaginary line generally perpendicular to both the direction of the current and the magnetic field direction for maximum voltage. If the body of material is crystalline in nature, the Hall effect varies in accordance with the orientation of the body with respect to the magnetic field. Hall effect magnetometers of the prior art have had either strong temperature dependent calibration or exhibited Shubnikov-de Haas oscillations at low temperatures or both. These limitations, of course, severely limited the usefulness of Hall effect magnetometers.

OBJECTS AND SUMMARY OF THE INVENTION

It is an object of the invention to provide a Hall effect magnetometer whose output varies linearly within one percent for magnetic fields up to at least 8 tesla at any given constant temperature between 1.2K and 300K.

It is another object of the invention to provide a Hall effect magnetometer in which the slope of the Hall resistivity versus magnetic field curve varies by one percent or less in the region 1.2K to 35K and by only 20 percent or less in the region 4K to 300K.

Still another object of the invention is to provide a Hall effect magnetometer which does not exhibit Shubnikov-de Haas oscillations at low temperatures.

Yet another object of the invention is to provide a Hall effect magnetometer which is useful over a wide temperature range without a recalibration.

Still another object of the invention is to provide for a magnetometer, a Hall effect crystal body having a flat natural cleavage plane perpendicular to the "C" axis so that the crystal may be accurately orientated in a magnetic field.

In summary, the invention provides a Hall effect magnetometer which is extremely accurate and convenient as compared to the prior art for a temperature range from 1.2K to 300K in fields up to 8 tesla.

DESCRIPTION OF A PREFERRED EMBODIMENT

A Hall effect magnetometer, as is known to those skilled in the art, comprises a body of Hall effect material which, for example, may be a thin rectangular body, through which a current is directed. If a magnetic field is then applied to the Hall effect material, a voltage indicative of the strength of the magnetic field will be produced between two points on the body generally lying on an axis perpendicular to the direction of current. Thus, by calibrating the output voltage of the Hall effect material to a known magnetic field, the Hall effect material can then be used to measure other magnetic fields by observing or measuring its output voltage.

In the instant invention, the Hall effect material for a magnetometer was prepared by weighing bismuth and selenium corresponding approximately ($\pm$ 0.2 Atomic %) to the stoichiometric ratio of 3 selenium atoms to 2 bismuth atoms. A number of single crystals having rhombohedral crystal structure were then grown by the Bridgeman technique as described in the *Art and Science of Growing Crystals*, J. J. Gilman, ed., John Wiley and Sons, New York, 1963. The resultant $Bi_2Se_3$ crystals were either p-type or n-type, that is, they had a positive or negative Hall coefficient. Alternatively, $Bi_2Se_3$ crystals may be grown by the zone refining technique as described in the book by William G. Pfann, *Zone Melting*, New York, John Wiley & Sons., Inc., 1959, pp. 57–97.

A specimen was then cleaved and cut and shaped by sand erosion to form a thin rectangular (layer plane) Hall effect body with a lug for attachment of leads on each side of the body midway between the ends. Leads from a current source were attached to respective opposite ends of the body with a conductive epoxy. Likewise, leads from a calibrated x–y recorder were attached to respective lugs on opposite sides of the body with a conductive epoxy. It will be understood that electrical connections can be made by other methods such as electroplating.

The Hall effect crystal body was then disposed in a magnetic field and oriented so that the magnetic field fell along the trigonal axis of the body. The magnetic field was varied from 0 to 8 tesla by a water cooled solenoid which had been calibrated against a rotating coil magnetometer and a standard magnet.

Parameters, such as output voltage, Hall resistivity and magneto resistance were measured as the magnetic field was varied. The same parameters were measured while the Hall effect magnetometer embodying the invention was subjected to a temperature range of from about 1.2K to about 300K. These temperatures were achieved by using liquid helium and liquid nitrogen together with a heater-controller system using a gallium, arsenide diode temperature sensor.

The results of these tests show that for a Hall effect crystal body of $Bi_2Se_3$, Hall resistivity as a function of magnetic field strength is linear to within plus or minus 1 percent for a constant temperature between 1.2K and 300K. The slope of the Hall resistivity versus magnetic field strength curve varies by about only one percent in the region 1.2K to 35K and by only 20 percent over the whole region of 1.2K to 300K.

The $Bi_2Se_3$ crystal material was studied not only in use as a magnetometer but by galvanomagentic and infrared optical reflection techniques as well. The infrared optical reflection measurements were made at 300K from 5 um to 25 um and band gaps less than about 0.1 ev were found. Because the starting purities of bismuth and selenium were very high, the impurity states in the intrinsic $Bi_2Se_3$ band gap (if greater than 0.1 e.v.) must be due to lack of stoichiometry in the crystal which behaves essentially as a semimetal. It was determined that the $Bi_2Se_3$ crystal behaves as a semimetal with at least two band conduction. The carrier concentration is in a range from $10^{18}$ to $10^{20}$ per cubic centimeter, but the device should be useful for greater ranges of carrier concentration. A p-type specimen with a carrier concentration of about $10^{19}$ per cubic centimeter performed very well within the field strengths and temperatures discussed above.

What is claimed is:

1. A method of making and using a Hall effect magnetometer comprising the steps of:
   mixing bismuth and selenium in a stoichiometric ration of 2 bismuth atoms to 3 selenium atoms;
   growing a single crystal of $Bi_2Se_3$;
   cleaving the crystal to form a layer plane body;
   disposing the body in a magnetic field variable from 0 tesla to 10 tesla at a temperature of from about 1.2K to 300K, said magnetic field being perpendicular to the layer plane body;
   directing a current through the layer plane body in a direction perpendicular to the magnetic field; and measuring voltage between two points on said layer plane body lying on a line perpendicular to the magnetic field and the direction of current flow.

2. The method of claim 1 wherein said $Bi_2Se_3$ crystal is grown by the Bridgeman or "modified" Bridgeman technique.

3. The method of claim 1 wherein said $Bi_2Se_3$ crystal is grown by the zone refining technique.

* * * * *